United States Patent
Murschall et al.

(10) Patent No.: US 6,872,446 B2
(45) Date of Patent: *Mar. 29, 2005

(54) WHITE, BIAXIALLY ORIENTED FILM MADE FROM A CRYSTALLIZABLE THERMOPLASTIC WITH HIGH WHITENESS AND WITH ADDITIONAL FUNCTIONALITY

(75) Inventors: Ursula Murschall, Nierstein (DE); Ulrich Kern, Ingelheim (DE); Klaus Oberlaender, Wiesbaden (DE); Thorsten Kiehne, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/084,028

(22) Filed: Feb. 27, 2002

(65) Prior Publication Data
US 2002/0187328 A1 Dec. 12, 2002

(30) Foreign Application Priority Data

Mar. 15, 2001 (DE) .......................................... 101 12 493

(51) Int. Cl.$^7$ ................................................. B32B 3/26
(52) U.S. Cl. ................. 428/304.4; 428/480; 428/308.4; 428/903.3; 428/910; 524/513
(58) Field of Search .......................... 428/308.4, 304.4, 428/480, 903.3, 910, 221; 524/513, 195

(56) References Cited

U.S. PATENT DOCUMENTS

| | | | | | |
|---|---|---|---|---|---|
| 4,033,936 A | * | 7/1977 | Bollert et al. | ................ | 528/287 |
| 4,415,684 A | * | 11/1983 | Lai et al. | ....................... | 524/92 |
| 4,812,501 A | * | 3/1989 | Odorisio et al. | ............ | 524/117 |
| 5,075,481 A | * | 12/1991 | Hofmann et al. | ............ | 558/76 |
| 5,306,606 A | * | 4/1994 | Tachibana et al. | ........... | 430/533 |
| 5,618,621 A | * | 4/1997 | Hasegawa et al. | ........... | 428/343 |
| 5,660,931 A | | 8/1997 | Kim et al. | ................... | 428/357 |
| 5,798,433 A | * | 8/1998 | Schmidt et al. | ............. | 528/279 |
| 5,800,962 A | * | 9/1998 | Benzing et al. | ............. | 430/259 |
| 6,270,888 B1 | * | 8/2001 | Rutter et al. | ................ | 428/347 |
| 6,436,219 B1 | * | 8/2002 | Francis et al. | ......... | 156/244.11 |
| 6,521,351 B2 | * | 2/2003 | Murschall et al. | .......... | 428/480 |
| 6,627,695 B2 | * | 9/2003 | Murschall et al. | .......... | 524/513 |

FOREIGN PATENT DOCUMENTS

| | | | |
|---|---|---|---|
| DE | 23 46 787 | 3/1975 | |
| EP | 0 791 680 A2 | 8/1997 | ............. D06L/3/12 |
| EP | 0 942 031 A1 | 9/1999 | ............. C08J/5/18 |
| WO | WO 95/10563 A1 | 4/1995 | ............. C08K/3/00 |
| WO | WO 96/15906 A1 | 5/1996 | ........... B32B/27/36 |
| WO | WO 01/53391 A1 * | 1/2001 | ............. C08K/5/00 |

OTHER PUBLICATIONS

Registry of Chemical Abstracts denoted "A" and "B".*

* cited by examiner

*Primary Examiner*—B. Hamilton Hess
*Assistant Examiner*—Tamra L. Dicus
(74) *Attorney, Agent, or Firm*—ProPat, L.L.C.

(57) ABSTRACT

The invention relates to a white, biaxially oriented film made from a crystallizable thermoplastic with high whiteness, the thickness of the film being in the range from 10 to 500 $\mu$m. The film comprises at least one rutile-type titanium dioxide as pigment and an optical brightener, with or without other additives, and has at least one additional functionality. The expression "additional functionality" includes UV resistance, yellowing resistance, photooxidative stability, flame retardancy, and sealability. This film may have one or more of the functional properties. All of these films are capable of cost-effective thermoforming, have good orientability, and have very good optical and mechanical properties. The invention further relates to a process for its production.

18 Claims, No Drawings

WHITE, BIAXIALLY ORIENTED FILM MADE FROM A CRYSTALLIZABLE THERMOPLASTIC WITH HIGH WHITENESS AND WITH ADDITIONAL FUNCTIONALITY

BACKGROUND OF THE INVENTION

1. Field of the Invention

The invention relates to a white, biaxially oriented film made from a crystallizable thermoplastic with high whiteness, the thickness of the film being in the range from 10 to 500 µm. The film comprises at least one rutile-type titanium dioxide as pigment and an optical brightener, with or without other additives, and has at least one additional functionality. The expression "additional functionality" includes UV resistance, yellowing resistance, photooxidative stability, flame retardancy, and sealability. This film may have one or more of the functional properties. All of these films are capable of cost-effective thermoforming, have good orientability, and have very good optical and mechanical properties. The invention further relates to a process for its production.

2. Description of the Related Art

White films with a thickness from 10 to 500 µm are well known. The whiteness of these known films is very generally ≦80%. The films also have an undesirable yellow tinge, i.e. are not brilliant white. An example of the Yellowness Index, which is thickness-dependent, is >45 for films of from 10 to 100 µm thickness.

DE-B 23 46 787 describes a flame-retardant raw material. Besides the raw material, its use to give films and fibers is also claimed. The following shortcomings were apparent when film was produced using this claimed phospholane-modified raw material: the raw material is very susceptible to hydrolysis and requires very good predrying. If the raw material is dried using dryers of the prior art it coagulates, making it extremely difficult to produce the film. The films produced, under conditions which are extreme and not cost-effective, embrittle when exposed to heat, i.e. their mechanical properties deteriorate sharply due to rapid onset of embrittlement, making the film industrially unusable. This embrittlement arises after as little as 48 hours of exposure to heat.

None of the knowledge encompassed by the prior art teaches or implies the existence of a white, biaxially oriented thermoplastic film with a thickness from 10 to 500 µm which has at least one additional functionality, its properties being retained during processing and use.

SUMMARY OF THE INVENTION

It is an object of the present invention to eliminate the disadvantages described of the prior art.

The invention therefore provides a white, biaxially oriented film with a thickness in the range from 10 to 500 µm, whose main constituent is at least one crystallizable thermoplastic and which comprises at least one rutile-type titanium dioxide as white pigment and at least one optical whitener, with or without other additives, and also has at least one other functionality.

The invention further provides a process for producing a white, biaxially oriented film with a thickness in the range from 10 to 500 µm whose main constituent is at least one crystallizable thermoplastic, which comprises extruding a crystallizable thermoplastic with at least one rutile-type titanium dioxide as white pigment and with at least one optical brightener, and with other substances providing functionality, to give a flat melt film, quenching and solidifying the same with the aid of a chill roll to give a substantially amorphous prefilm, then reheating this film and stretching the same at least once longitudinally and transversely, then heat-setting the film at temperatures of from 200 to 280° C., and finally cooling and winding up the film.

The expression "other or additional functionality" includes UV resistance, yellowing resistance, photooxidative stability, flame retardancy, and sealability, and also the presence of a coating on one or both surfaces and/or the presence of one or two corona-treated sides. This film may have one or more of the functional properties.

DETAILED DESCRIPTION OF THE PREFERRED EMBODIMENTS

An additional functionality therefore implies that the film has been provided with a flame retardant and/or with UV stabilizers, and/or has been colored using a soluble dye, and/or is sealable, and/or has been coated on one or both surfaces, and/or has been corona-treated on one or both sides.

All films according to the present invention have not only good orientability and good mechanical and optical properties, but in particular have high whiteness combined with low Yellowness Index and are capable of cost-effective thermoforming.

Examples of the good optical properties are homogeneous, streak-free coloring over the entire width and length of the film, low transparency ($\leq 40\%$), and acceptable surface gloss ($\geq 10$).

Low Yellowness Index (YI) implies that the Yellowness Index of the films of the invention is $\leq 40$, preferably $\leq 35$, in particular $\leq 30$ for a film thickness in the range from 10 to 500 µm.

High whiteness implies that the whiteness of the films is $\geq 85\%$, preferably $\geq 87\%$, in particular $\geq 90\%$.

The good mechanical properties include a high modulus of elasticity ($E_{MD}>3300$ N/mm$^2$; $E_{TD}>4800$ N/mm$^2$), and also good values for tensile stress at break (in MD>130 N/mm$^2$; in TD>180 N/mm$^2$), and good values for longitudinal and transverse tensile strain at break (in MD>120%; in TD>70%).

The good orientability includes excellent capability of the film to be oriented both longitudinally and transversely during its production, without break-offs.

Thermoformability implies that the film can be thermoformed on commercially available thermoforming machinery without any uneconomic predrying, to give complex and large-surface-area moldings.

The film of the invention is moreover recyclable, i.e. cut material arising during film production operations can be fed back into the production process, in particular with no loss of optical or mechanical properties, e.g. without any adverse effect on the Yellowness Index of the film.

As main constituent, the film comprises at least one crystallizable thermoplastic. Examples of suitable crystallizable or semicrystalline thermoplastics are polyethylene terephthalate (PET), polyethylene naphthalate (PEN), polybutylene terephthalate (PBT), bibenzoyl-modified polyethylene terephthalate (PETBB), bibenzoyl-modified polybutylene terephthalate (PBTBB), bibenzoyl-modified polyethylene naphthalate (PENBB), and mixtures of these, preference being given to polyethylene terephthalate and polyethylene naphthalate.

Examples of materials which may be used, besides the main monomers, to prepare the thermoplastics are dimethyl terephthalate (DMT), ethylene glycol (EG), propylene glycol (PG), 1,4-butanediol, terephthalic acid (TA), benzenedicarboxylic acid, 2,6-naphthalenedicarboxylate (NDC), and/or 2,6-naphthalenedicarboxylic acid (NDA), and also isophthalic acid (IPA), and trans- and/or cis-1,4-cyclohexane-dimethanol (c-CHDM, t-CHDM or c/t-CHDM).

For the purposes of the invention, crystallizable thermoplastics are crystallizable homopolymers, crystallizable copolymers, crystallizable compositions, crystallizable recycled materials, and other variants of crystallizable thermoplastics.

Preferred starting materials for producing the film are cystallizable thermoplastics which have a crystalline melting point Tm, measured by DSC (Differential Scanning Calorimetry) using a heating rate of 20° C./min, of from 180° C. to more than 365° C., preferably from 180° C. to 310° C., a crystallization temperature range Tc of from 75° C. to 280° C., a glass transition temperature Tg of from 65° C. to 130° C. , a density measured to DIN 53479, of from 1.10 to 1.45 g/cm$^3$, and crystallinity of from 5 to 65%, preferably from 20 to 65%.

For thermoformability it is important that the crystallizable thermoplastic has a diethylene glycol content of $\geq 1.0\%$ by weight, preferably $\geq 1.2\%$ by weight, in particular $\geq 1.3\%$ by weight, and/or a polyethylene glycol content of $\geq 1.0\%$ by weight, preferably $\geq 1.2\%$ by weight, in particular $\geq 1.3\%$ by weight, and/or an isophthalic acid content of from 3 to 10% by weight.

Main constituent implies that the amount of thermoplastic is preferably in the range from 50 to 98% by weight, in particular from 75 to 95% by weight. The remainder up to 100% may consist of other usual additives for biaxially oriented films, besides the inorganic pigment and the optical brightener.

The film of the invention may have either one layer or two or more layers. It may also have been coated with various copolyesters or adhesion promoters. For cost-effective production it generally comprises the antiblocking agents and lubricants usual for films.

In the embodiment having two or more layers, the film is composed of at least one core layer and of at least one outer layer, particular preference being given to a three-layer A-B-A or A-B-C structure.

For this embodiment it is important that the thermoplastic of the core layer has a standard viscosity similar to that of the thermoplastic of the outer layer(s) which adjoin(s) the core layer.

In one particular embodiment, the outer layers may be composed of a polyethylene terephthalate, of a bibenzoyl-modified polyethylene terephthalate polymer, of a bibenzoyl-modified and/or unmodified polyethylene naphthalate polymer, or of a bibenzoyl-modified and/or unmodified polyethylene terephthalate-polyethylene naphthalate copolymer or composition.

Again, in this embodiment the thermoplastics of the outer layers have standard viscosities similar to that of the thermoplastic of the core layer.

The constituents added to the thermoplastic in the film may be metered either into the base layer or else into one or both outer layers. Clearly, the extrusion process may be used here, and this preferably includes the masterbatch process.

In masterbatch technology it is important that the grain size and the bulk density of the masterbatch are similar to those of the thermoplastic, permitting homogeneous distribution and therefore homogeneous achievement of the desired film properties, such as the white coloration, the flame retardancy, and the UV resistance.

In masterbatch technology, the additives are first dispersed in a solid carrier material. Carrier materials which may be used are the thermoplastic itself, e.g. the polyethylene terephthalate, or else other polymers sufficiently compatible with the thermoplastic. To produce the film, the masterbatch is mixed with the intended thermoplastic raw material for the film and treated together therewith in an extruder, whereupon the constituents fuse into one another and thus become dispersed in the thermoplastic.

The film of the invention comprises at least one rutile-type titanium dioxide as pigment, the amount of pigment preferably being in the range from 2 to 25% by weight, based on the weight of the crystallizable thermoplastics. According to the invention, the titanium dioxide is metered in by way of what is known as masterbatch technology during production of the film.

The film moreover comprises at least one optical brightener, the amount used being from 10 to 50,000 ppm, preferably from 20 to 30,000 ppm, in particular from 50 to 25,000 ppm, based on the weight of the crystallizable thermoplastics. The optical brightener, too, is metered in by way of what is known as masterbatch technology.

Suitable optical brighteners are benzoxazole derivatives, triazines, phenylcoumarins, and bisstearylbiphenyls. Among these, preference is given to ®Tinopal (Ciba-Geigy, Basle, Switzerland), ®Hostalux KS (Clariant, Germany), and ®Eastobrite OB-1 (Eastman Chemicals, Germany).

In one advantageous procedure, the thermoplastic has additions of soluble blue dyes as well as of optical brightener. An example of a blue dye which has proven to be suitable is ®Sudan Blue 2 (BASF, Ludwigshafen).

The amounts used of these dyes are from 10 to 10,000 ppm, preferably from 20 to 5,000 ppm, in particular from 50 to 1,000 ppm, based on the weight of the crystallizable thermoplastics.

The optical brighteners used according to the invention are capable of absorbing UV radiation in the range from 360 to 380 nm and of re-emitting this as visible blue-violet light of longer wavelength.

The titanium dioxide particles are mainly composed of rutile, whose opacifying effect is greater than that of anatase. In one preferred embodiment, the titanium dioxide particles are composed of at least 95% by weight of rutile. They may be prepared by a usual process, e.g. the chloride process or the sulfate process. The amount of the inner core layer is advantageously from 2 to 25% by weight, based on the weight of the core layer. The average particle size is relatively small, preferably in the range from 0.1 to 0.5 µm, in particular from 0.1 to 0.3 µm (sedimentation method).

Titanium dioxide of the type described does not cause production of vacuoles within the polymer matrix during production of the film.

The titanium dioxide particles may have a coating of inorganic oxides, as usually used as a coating for $TiO_2$ white pigment in papers or paints, to improve lightfastness.

$TiO_2$ is known to be photoactive. On exposure to UV radiation, free radicals form on the surface of the particles. These free radicals can migrate into the polymer matrix, causing degradation reactions and yellowing. To prevent this, the $TiO_2$ particles may be given an oxidic coating. Particularly suitable oxides for the coating include the oxides of aluminum, silicon, zinc, or magnesium, or a mixture of two or more of these compounds. $TiO_2$ particles with a coating made from a number of these compounds are described by way of example in EP-A-0 044 515 and EP-A-0 078 633. The coating may also comprise organic compounds having polar and nonpolar groups. The organic compounds have to be sufficiently thermally stable during the production of the film by extruding the polymer melt. Examples of polar groups are —OH; —OR; —COOX; (X=R; H or Na, R=alkyl having from 1 to 34 carbon atoms). Preferred organic compounds are alkanols and fatty acids having from 8 to 30 carbon atoms in the alkyl group, in particular fatty acids and primary n-alkanols having from 12 to 24 carbon atoms, and also polydiorganosiloxanes and/or polyorganohydrosiloxanes, e.g. polydimethylsiloxane and polymethylhydrosiloxane.

The coating for the titanium dioxide particles is generally composed of from 1.0 to 12.0 g, preferably from 2.0 to 6.0 g, of inorganic oxides and/or from 0.5 to 3.0 g, preferably from 0.7 to 1.5 g, of organic compounds, based on 100.0 g of titanium dioxide particles. The coating is usually applied to the particles in aqueous suspension. The inorganic oxides in the aqueous suspension may be precipitated from water-soluble compounds, e.g. alkali metal nitrates, in particular sodium nitrate, sodium silicate (waterglass) or silica.

For the purposes of the present invention, inorganic oxides, such as $Al_2O_3$ or $SiO_2$, also include the hydroxides and their various states of dehydration, e.g. oxide hydrate, the precise formula and structure of these being unknown. The oxide hydrates, e.g. of aluminum and/or of silicon, are precipitated onto the calcined and ground $TiO_2$ pigment, in aqueous suspension, and the pigments are then washed and dried. This precipitation may therefore take place directly in a suspension such as that produced within the production process of the calcination followed by wet-grinding. The oxides and/or oxide hydrates of the respective metals are precipitated from the water-soluble metal salts within the known pH range: for example, for aluminum use is made of aluminum sulfate in aqueous solution (pH: $\leq 4$) and the oxide hydrate is precipitated within the pH range from 5 to 9, preferably from 7 to 8.5, by adding aqueous ammonia solution or sodium hydroxide solution. If the starting material is waterglass solution or alkali metal aluminate solution, the pH of the initial charge of $TiO_2$ suspension should be within the strongly alkaline range (pH: $\geq 8$). The precipitation then takes place within the pH range from 5 to 8, by adding mineral acid, such as sulfuric acid. Once the metal oxides have been precipitated, the stirring of the suspension continues for from 15 min to about 2 h, aging the precipitated layers. The coated product is separated off from the aqueous dispersion, washed, and dried at an elevated temperature, in particular from 70 to 100° C.

In one preferred embodiment, the film of the invention comprises titanium dioxide from the company Kerr McGee (®Tronox RFK2) or Sachtleben (®Hombitan grades R or RC).

The synergistic action of the rutile-type titanium dioxide and of the optical brightener gives the film whiteness $\geq 85\%$, preferably $\geq 87\%$, in particular $\geq 90\%$, combined with a Yellowness Index of $\leq 40$, preferably $\leq 35$, in particular $\leq 30$, the thickness being in the range from 10 $\mu$m to 500 $\mu$m. The film is visually extremely white and has no yellow tinge.

According to the invention, the film may have been coated on at least one of its surfaces in such a way that the coating on the finished film has a thickness of from 5 to 100 nm, preferably from 20 to 70 nm, in particular from 30 to 50 nm. The coating is preferably applied in-line, i.e. during the process to produce the film, advantageously after extrusion. Preference is also given to application by way of reverse gravure roll coating, which can apply the coatings extremely uniformly at the thicknesses mentioned. The coatings are applied as a dilute solution, emulsion, or dispersion, preferably in aqueous form, to at least one surface of the film, and the solvent is then evaporated. If the coatings are applied in-line prior to transverse stretching, the heat treatment during transverse stretching and subsequent heat-setting is usually sufficient to evaporate the solvent and dry the coating. They provide the surface of the film with an additional function, for example making the film sealable, printable, metallizable, sterilizable, or antistatic, or improving its aroma barrier, for example, or permitting adhesion to materials which would not otherwise adhere to the surface of the film (e.g. photographic emulsions). Examples of substances/formulations which give additional functionality are:

acrylates, polyethylene vinyl alcohols, polyvinylidene dichloride, waterglass ($Na_2SiO_4$), hydrophilic polyesters (PET/IPA polyesters containing the sodium salt of 5-sulfoisophthalic acid), vinyl acetates, polyvinyl acetates, polyurethanes, the alkali metal or alkaline earth metal salts of $C_{10}$-$C_{18}$ fatty acids, butadiene copolymers with acrylonitrile or with methyl methacrylate, with methacrylic acid, with acrylic acid, or with esters thereof.

The substances/formulations which give the additional functionality may comprise from 0.05 to 5% by weight, preferably from 0.1 to 3.0% by weight, of the usual additives, e.g. antiblocking agents or pH stabilizers.

The film may also have been corona-treated at least on one side and/or have been coated, at least on one side, with a scratch-resistant coating, with a copolyester or with an adhesion promoter, and/or may have been subjected to vapor-deposition of ethylene-vinyl alcohol copolymer, with polyvinyl alcohol, or with polyvinylidine dichloride.

The films may also be coated—preferably in an off-line process—with metals, such as aluminum, or with ceramic materials, such as $SiO_x$ or $Al_xO_y$. This improves gas-barrier properties in particular.

The thermoforming process generally encompasses the steps of predrying, heating, molding, cooling, demolding, conditioning. Surprisingly, in the thermoforming process it was found that the films of the invention can be thermoformed without predrying. This advantage drastically reduces the costs of the forming process when comparison is made with thermoformable polycarbonates or polymethyl methacrylate films which require predrying times of from 10 to 15 hours at temperatures of from 100 to 120° C., depending on thickness. It was also highly surprising that the reproduction of detail on the molding is excellent. Another example of a way of feeding the film to the thermoforming process is from a roll.

It was more than surprising that the higher diethylene glycol content and/or polyethylene glycol content and/or IPA content in comparison with the standard thermoplastic makes the films of the invention capable of cost-effective thermoforming on commercially available thermoforming plants and gives excellent reproduction of detail.

The following process parameters have generally proven to be suitable for the thermoforming process:

| Process step | Film of the Invention |
|---|---|
| Predrying | not required |
| Mold temperature | from 100 to 140° C. |
| Heating time per 10 μm of film thickness | <5 sec per 10 μm of film thickness |
| Film temperature during molding | from 100 to 160° C. |
| Possible orientation factor | from 1.0 to 2.5 |
| Reproduction of detail | excellent |
| Shrinkage | <1.5% |

In one particular embodiment, the film of the invention may have been rendered UV-resistant.

Light, in particular the ultraviolet content of the solar radiation, i.e. the wavelength region from 280 to 400 nm, causes degradation in thermoplastics, the results of which are not only a change in appearance due to color change or yellowing but also an extremely adverse effect on the mechanical and physical properties of the films made from the thermoplastics.

The suppression of this photooxidative degradation is of considerable industrial and economic importance, since without it many thermoplastics have drastically reduced scope of application.

The absorption of UV light by polyethylene terephthalates, for example, starts below 360 nm, increases markedly below 320 nm, and is very pronounced below 300 nm. Maximum absorption occurs at between 280 and 300 nm.

In the presence of oxygen it is mainly chain cleavage which occurs, but without crosslinking. The predominant photooxidation products in quantity terms are carbon monoxide, carbon dioxide, and carboxylic acids. Besides the direct photolysis of the ester groups, consideration has to be given to oxidation reactions which proceed via peroxide radicals, again to form carbon dioxide.

In the photooxidation of polyethylene terephthalates there can also be cleavage of hydrogen at the position a to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for films of the invention, since they cause discoloration or color change.

Light stabilizers which are suitable UV stabilizers are those which absorb at least 70%, preferably 80%, particularly preferably 90%, of the UV light in the wavelength region from 180 to 380 nm, preferably from 280 to 350 nm. These are particularly suitable if they are thermally stable, i.e. do not decompose into cleavage products, or cause evolution of gas, in the temperature range from 260 to 300° C. Examples of light stabilizers which are suitable UV stabilizers are 2-hydroxybenzophenones, 2-hydroxybenotriazols, organonickel compounds, salicylic esters, cinnamic ester derivatives, resorcinol monobenzoates, oxanilides, hydroxybenzoic esters, benzoxazinones, and sterically hindered amines and triazines, preference being given to the 2-hydroxybenzotriazoles, the benzoxazinones, and the triazones.

The film of the invention comprises at least one UV stabilizer as light stabilizer, the concentration of the UV stabilizer preferably being in the range from 0.01 to 5.0% by weight, in particular in the range from 0.1 to 3.0% by weight, based on the weight of the layer of the crystallizable thermoplastic. In one particularly preferred embodiment, the film comprises from 0.01 to 5.0% by weight of 2-(4,6-diphenyl-1,3,5-triazin-2-yl)-5-hexyloxyphenol of the formula

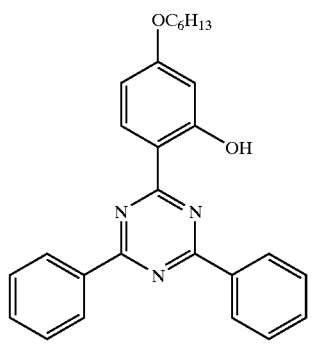

or from 0.01 to 5.0% by weight of 2,2-methylenebis(6-(2H-benzotriazol-2-yl)-4-(1,1,2,2-tetramethylpropyl)phenol of the formula

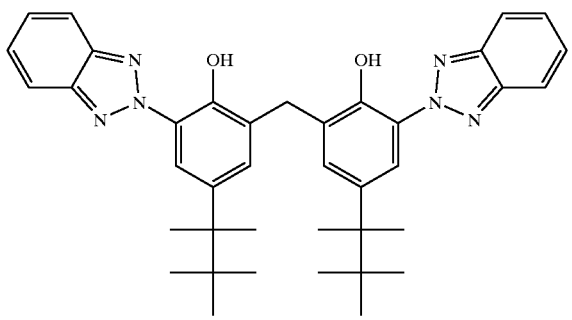

or from 0.1 to 5.0% by weight of 2,2'-(1,4-phenylene)bis [4H-3,1-benzoxazin-4-one] of the formula

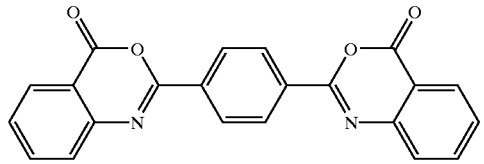

In another embodiment, it is also possible to use a mixture of these UV stabilizers, or a mixture of at least one of these UV stabilizers with other UV stabilizers, the total concentration of light stabilizers preferably being from 0.1 to 5.0% by weight, particularly preferably in the range from 0.5 to 3.0% by weight, based on the weight of the layer in which they are present.

It is entirely surprising that the use of the abovementioned UV stabilizers in films gives the desired result. If attempts are made to achieve some degree of UV resistance by using an antioxidant, the result, inter alia, is color change after weathering.

However, if use is made of commercially available UV stabilizers which absorb UV light and generally therefore offer protection it is found that the UV stabilizer has insufficient thermal stability and at temperatures of from 200 to 240° C. decomposes or causes evolution of gas, and large amounts (from about 10 to 15% by weight) of UV stabilizer have to be incorporated in order to absorb the UV light and prevent damage to the film.

At these high concentrations, the film exhibits severe color changes, even following production. There is also an adverse effect on mechanical properties. Examples of phenomena are:

die deposits, leading to profile variation;

roller deposits from the UV stabilizer, an effect causing impairment of optical properties (poor haze, adhesion problems, nonuniform surface);

deposits during the production process.

It was therefore more than surprising that even low concentrations of the UV stabilizer of the invention achieve excellent UV protection. It was very surprising that, together with this excellent UV protection, the Yellowness Index of the film is unchanged from that of an unstabilized film within the bounds of accuracy of measurement;

there is no evolution of gases, and there are no die deposits, and the film therefore has excellent optical properties and excellent profile and layflat;

the UV-resistant film can be produced in a reliable and stable manner, and is therefore also cost-effective.

If flame retardancy is present, this implies that in what is known as a fire protection test the material meets the requirements of DIN 4102, Part 2 and in particular the requirements of DIN 4102, Part 1, and can be classified in construction materials class B 2, in particular B1, for low-flammability materials.

Any flame-retardant film here should moreover pass the UL 94 test known as the "Horizontal Burning Test for Flammability of Plastic Materials", therefore qualifying for classification 94 VTM-0.

The film of the invention comprises a flame retardant metered in by way of what is known as masterbatch technology directly during production of the film, the flame retardant concentration being in the range from 0.5 to 30.0% by weight, preferably from 1.0 to 20.0% by weight, based on the weight of the layer of the crystalizable thermoplastic. The concentration of the flame retardant in the masterbatch is generally in the range from 5.0 to 60.0% by weight. The flame retardant is dispersed in the carrier material, or may also have been bonded chemically within the thermoplastic.

Typical flame retardants include bromine compounds, chloroparaffins and other chlorine compounds, antimony trioxide, and alumina trihydrates, the halogen compounds being disadvantageous since they produce halogen-containing byproducts. Other serious disadvantages are the low lightfastness of films in which these compounds are present, and the evolution of hydrogen halides in the event of a fire.

Examples of suitable flame retardants used according to the invention are organic phosphorus compounds, such as carboxyphosphinic acids, anhydrides thereof, and esters of alkanephosphonic acids, preferably esters of methanephosphonic acid. It is important for the invention that the organic phosphorus compound is soluble in the thermoplastic, since otherwise the optical properties required are not complied with.

Since the flame retardants generally have some degree of susceptibility to hydrolysis, concomitant use of a hydrolysis stabilizer may be advisable.

The hydrolysis stabilizers used are generally amounts of from 0.01 to 1.0% by weight of phenolic stabilizers, of alkali metal/alkaline earth metal stearates, and/or of alkali metal/alkaline earth metal carbonates. The amounts of phenol stabilizers used are preferably from 0.05 to 0.6% by weight, in particular from 0.15 to 0.3% by weight, and their molar mass is preferably above 500 g/mol. Particularly advantageous compounds are pentaerythrityl tetrakis-3-(3,5-di-tert-butyl-hydroxyphenyl)propionate and 1,3,5-trimethyl-2,4,6-tris(3,5-di-tert-butyl-4-hydroxybenzyl)benzene.

In this preferred embodiment, the flame-retardant film of the invention comprises, as main constituent, a crystallizable PET, titanium dioxide, an optical brightener, from 1.0 to 20.0% by weight of an organic phosphorus compound as flame retardant soluble in the thermoplastic, and from 0.1 to 1.0% by weight of a hydrolysis stabilizer. ®Amgard P 1045 from Albright & Wilson is preferred as flame retardant.

These data concerning flame retardant and hydrolysis stabilizer are also applicable with respect to other thermoplastics to be used according to the invention.

Very surprisingly, fire protection tests to DIN 4102 and the UL test have shown that in order to provide improved flame retardancy in a three-layer film it is entirely sufficient to provide flame retardants in the outer layers whose thickness is from 0.5 to 2 μm. If required, and if fire protection requirements are stringent, the core layer may also have what is known as a base level of flame retardants.

Tests have moreover shown that the film of the invention does not embrittle when exposed to temperatures above 100° C. for a prolonged period. This result is attributed to the synergistic action of appropriate precrystallization, predrying, masterbatch technology, and hydrolysis stabilizer.

For the purposes of the present invention, no embrittlement after exposure to heat means that the film does not embrittle or have any disadvantageous mechanical properties after 100 hours of conditioning at 100° C. in a circulating-air heating cabinet.

Surprisingly, films of the invention in the thickness range from 10 to 350 μm comply with the requirements of construction materials classes B2 and B1 to DIN 4102 and with the requirements of the UL 94 test.

The surface gloss of films of the invention, measured to DIN 67530 (measurement angle 20°), is ≧15, preferably ≧20, and the light transmittance L, measured to ASTM D1003, is ≦85%, preferably ≦80%, and this is surprisingly good for the desired effect, combined with the white coloration.

Where very good sealability is required, and where this property cannot be achieved via on-line coating, the film of the invention has a structure of at least three layers, the layers encompassed in one particular embodiment then being the base layer B, the sealable outer layer A and the outer layer C, which may be sealable or nonsealable. In the embodiment where the outer layer C is sealable the outer layers A and C are identical.

Sealable Outer Layer A

The sealable outer layer A applied by coextrusion to the base layer B is based on polyester copolymers and is composed substantially of copolyesters composed predominantly of isophthalic acid units and of terephthalic acid units and of ethylene glycol units. The remaining monomer units are derived from other aliphatic, cycloaliphatic, or aromatic diols and, respectively, dicarboxylic acids, as may also be present in the base layer. The preferred copolyesters which provide the desired sealing properties are those composed of ethylene terephthalate units and ethylene isophthalate units, and of ethylene glycol units. The proportion of ethylene terephthalate is from 40 to 95 mol % and the corresponding proportion of ethylene isophthalate is from 60 to 5 mol %.

Preference is given to copolyesters in which the proportion of ethylene terephthalate is from 50 to 90 mol % and the corresponding proportion of ethylene isophthalate is from 50 to 10 mol %, and very particular preference is given to copolyesters in which the proportion of ethylene terephthalate is from 60 to 85 mol % and the corresponding proportion of ethylene isophthalate is from 40 to 15 mol %.

Nonsealable Outer Layer C

For the other, nonsealable outer layer C, or for any other intermediate layers present, use in principle may be made of the polymers described above for the base layer B.

The desired sealing and processing properties of the film of the invention are obtained from the properties of the copolyester used for the sealable outer layer combined with the topographies of the sealable outer layer A and of the sealable or nonsealable outer layer C.

The minimum sealing temperature of 130° C. and the seal seam strength of at least 0.6 N/15 mm are achieved when the copolymers described in more detail above are used for the sealable outer layer A. The best sealing properties for the film are achieved when no other additives are added to the copolymer, in particular no inorganic or organic fillers. For a given copolyester, this gives the lowest minimum sealing temperature and the highest seal seam strengths. However, in this case the handling of the film is poor, since the surface of the sealable outer layer A has a marked tendency to block. The film is difficult to wind and is not at all suitable for further processing on high-speed packaging machinery. To improve the handling of the film and its processability, it is necessary to modify the sealable outer layer A. This is best done with the aid of suitable antiblocking agents of selected size, a certain amount of which is added to the sealable layer, and specifically in such a way as firstly to minimize blocking of the film and secondly to bring about only insignificant impairment of sealing properties.

To achieve other desired properties, the film may also have been corona- or flame-treated. The treatment intensity selected is such that the surface tension of the film is generally above 45 mN/m.

One way of producing the film of the invention is by extrusion on an extrusion line.

Cost-effect production includes the capability of the raw materials or the raw material components needed for producing the film to be dried by commercially available industrial dryers, such as vacuum dryers (i.e. dryers operating at reduced pressure), fluidized-bed dryers, or fixed-bed dryers (tower dryers). It is significant that the additives used according to the invention do not cause evolution of gas or form wool deposits in the dryers, and that the materials do not coagulate or become thermally degradated. The dryers mentioned generally operate at atmospheric pressure, with temperatures of from 100 to 170° C.

In the case of a vacuum dryer, which permits the least aggressive drying conditions, the raw material passes through a range of temperature from about 30° C. to 130° C. at a reduced pressure of 50 mbar. What is known as post-drying is then required, in a hopper at temperatures from 100 to 130° C. with a residence time of from 3 to 6 hours.

It is significant for the invention that the masterbatch which comprises the hydrolysis stabilizer and the masterbatch which comprises the flame retardant, where appropriate, and the UV stabilizer, where appropriate, is in each case precrystallized or predried. This predrying includes gradual heating of the masterbatch at reduced pressure (from 20 to 80 mbar, preferably from 30 to 60 mbar, in particular from 40 to 50 mbar) with stirring and, where appropriate, post-drying at constant elevated temperature, likewise at reduced pressure. It is preferable for the masterbatch to be charged batchwise at room temperature from a feed vessel in the desired blend together with the polymer of the base and/or outer layers and, where appropriate, with other raw material components into a vacuum dryer in which the temperature profile moves from 10 to 160° C., preferably from 20 to 150° C., in particular from 30 to 130° C., during the course of the drying time or residence time. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is post-dried in a downstream vessel, likewise evacuated, at temperatures of from 90 to 180° C., preferably from 100 to 170° C., in particular from 110 to 160° C., for from 2 to 8 hours, preferably from 3 to 7 hours, in particular from 4 to 6 hours.

In the production of a film according to the invention it has been found that the film can be produced without any agglomeration in the dryer by using masterbatch technology and a suitable predrying or precrystallization of the particular masterbatch used and, where appropriate, using low concentrations of hydrolysis stabilizer. In addition, neither any evolution of gas nor any deposits within the production process were found.

During the production of the film it was also found that the film has excellent capability for longitudinal and transverse orientation, without break-offs.

The films may be produced by known processes from a thermoplastic raw material, rutile-type titanium dioxide, the optical brightener, the blue dye, where appropriate, and, where appropriate, other raw materials and/or other usual additives in the usual amount of from 0.1 to not more than 10.0% by weight, either as a monofilm or as a multilayer, where appropriate coextruded film with identical or different surfaces, for example one surface having been pigmented and the other surface comprising no pigment. One or both surfaces of the film may also be provided with a usual functional coating, using known processes.

In the multilayer embodiment, the titanium dioxide and the optical brightener and, where appropriate, the blue dye are preferably present in the core layer. The additives may also be present, if required, in the outer layers.

Unlike in the single-layer embodiment, the amount of additives here is based on the weight of the thermoplastics in the layer to which the additive(s) has/have been added.

In the preferred extrusion process for producing the film, the polymers or mixtures of raw materials are fed to an extruder, or to two or more extruders in the case of multilayer films. Any foreign bodies or contamination present may be removed from the polymer melt prior to extrusion by way of filters. The melt(s) is/are then shaped in an extrusion die, or a coextrusion die in the multilayer case, and in the multilayer case are laminated together. The monofilm or the multilayer film is then quenched with the aid of a chill roll and solidified to give a substantially amorphous, i.e. unoriented, film. This film is then reheated and stretched longitudinally and transversely, or transversely and longitudinally, or longitudinally, transversely, and again longitudinally and/or transversely. The stretching temperatures are generally from $Tg+10°$ C. to $Tg+60°$ C. (Tg=glass transition temperature) the stretching ratio of the longitudinal stretching is usually from 2 to 6, preferably from 2.5 to 4.5, that for transverse stretching from 2 to 5, preferably from 3 to 4.5, and that for any second longitudinal stretching carried out from 1.1 to 3. Where appropriate, the first longitudinal stretching may be carried out simultaneously with the transverse stretching (simultaneous stretching). The heat-setting of the film then follows at oven temperatures of from 200 to 280° C., in particular from 220 to 270° C. The film is then cooled and wound up.

During the production of the film according to the invention the process for producing the film was found to be reliable. No evolution of any type of gas was found in the production process, and this is significant for the invention.

Weathering tests have shown that, even after extrapolation to from 5 to 7 years of external use, UV-stabilized films of the invention generally show no yellowing, no embrittlement, no loss of surface gloss, no surface cracking, and no impairment of mechanical properties.

The surprising combination of excellent properties gives the film of the invention excellent suitability for a large number of varied applications indoors and outdoors, for example for interior coverings, for constructing exhibition stands, for exhibition requisites, for displays, for placards, for labels, for the fitting out of shops or of stores, as short-lived advertising placards, labels, or other promotional items, as a laminating medium, or for food or drink applications, for medical applications, in the construction sector, for outdoor applications, as a furniture film, as a packaging film, or in the deep-freeze sector.

The testing of each property in the examples below used the following standards or methods.

DEG Content, PEG Content, IPA Content

DEG content, PEG content and IPA content are determined by gas chromatography after saponification in methanolic KOH and neutralization with aqueous HCl.

Surface Gloss

Surface gloss is measured to DIN 67530 using a measurement angle of 20°.

Light Transmittance, Transparency

For the purposes of the present invention, light transmittance/transparency is the ratio of total transmitted light to the quantity of incident light. It is measured using "Hazegard plus" equipment to ASTM D1003.

Surface Defects, Uniform Coloration

Visual determination is used for surface defects and uniform coloration.

Mechanical Properties

Modulus of elasticity, tensile stress at break and tensile strain at break are measured longitudinally and transversely to ISO 527-1-2.

SV (DCA), IV (DCA)

Standard viscosity SV (DCA) is measured by a method based on DIN 53726 in dichloroacetic acid. Intrinsic viscosity (IV) is calculated as follows from standard viscosity (SV): IV (DCA)=$6.67 \cdot 10^{-4}$ SV (DCA)+0.118.

Weathering (Bilateral), UV Resistance

UV resistance is tested to the ISO 4892 test specification as follows:

| Test equipment | Atlas Ci65 Weather-Ometer |
| --- | --- |
| Test conditions | ISO 4892, i.e. artificial weathering |
| Irradiation time | 1000 hours (per side) |
| Irradiation | 0.5 W/m², 340 nm |
| Temperature | 63° C. |
| Relative humidity | 50% |
| Xenon lamp | Internal and External filter made from borosilicate |

-continued

| Irradiation cycles | 102 minutes of UV light, then 18 minutes of UV light with water spray on specimens, then again 102 minutes of UV light, etc. |
| --- | --- |

Yellowness

Yellowness Index (YI) is the deviation from colorlessness in the "yellow" direction and is measured to DIN 6167.

Fire Performance

Fire performance is determined to DIN 4102 Part 2, construction materials class B2 and to DIN 4102 Part 1, construction materials class B1, and also by the UL 94 test.

Whiteness

Whiteness is determined by the Berger method, generally using more than 20 mutually superposed layers of film. Whiteness is determined with the aid of the ®ELREPHO electrical reflectance photometer from Zeiss, Oberkochem (Germany), with standard illuminant C and 2° standard observer. Whiteness is defined as W=RY+3RZ-3RX. W=whiteness, and RY, RZ, and RX=corresponding reflection factors using the Y, Z, and X color-measurement filter. The whiteness standard used is a barium sulfate pressing (DIN 5033, Part 9). A detailed description is given by Hansl Loos "Farbmessung" [Color Measurement], Verlag Beruf und Schule, Itzehoe (1989).

Surface Tension

Surface tension was determined by what is known as the ink method (DIN 53364).

Determination of Minimum Sealing Temperature

Hot-sealed specimens (seal seam 20 mm×100 mm) were produced using Brugger HSG/ET sealing apparatus, by sealing the film at different temperatures with the aid of two heated sealing jaws at a sealing pressure of 2 bar and with a sealing time of 0.5 s. From the sealed specimens, test strips of 15 mm width were 30 cut. The T-seal seam strength was measured as in the determination of seal seam strength. The minimum sealing temperature is the temperature at which a seal seam strength of at least 0.5 N /15 mm is achieved.

Seal Seam Strength

To determine seal seam strength, two film strips of width 15 mm were placed one on top of the other and sealed at 130° C. with a sealing time of 0.5 seconds and a sealing pressure of 2 bar (apparatus: Brugger model NDS, single-side-heated sealing jaw). The seal seam strength was determined by the T-peel method.

EXAMPLES

The films in the examples and comparative examples below are all single- or multilayer white, biaxially oriented films of varying thickness, produced on an extrusion line.

Unless otherwise stated, the polyethylene terephthalate (clear polymer) from which the films were produced and the polyethylene terephthalate used to produce the masterbatches had a standard viscosity SV (DCA) of 810, corresponding to intrinsic viscosity of 0.658 dl/g.

All of the films were weathered bilaterally for 1000 hours per side using the Atlas Ci65 Weather-Ometer to the ISO 4892 test specification, and then tested for thermoformability, discoloration, surface defects, and gloss.

Example 1

A white film was produced of thickness 50 µm and comprising polyethylene terephthalate (grade RT49, KoSa, Germany) as main constituent, 6% of rutile-type titanium dioxide (®Tronox RFK2, Kerr McGee, Germany), 192 ppm of optical brightener (®Hostalux KS, Clariant, Germany), and also 30 ppm of blue dye ®Sudan Blue 2 (BASF, Germany).

The additives titanium dioxide, optical brightener and blue dye were added in the form of masterbatches.

Masterbatch (1) is composed of 50% titanium dioxide, 0.16% optical brightener, and also 49.84% clear polymer. Masterbatch (2) comprises clear polymer and 1500 ppm of blue dye.

Prior to extrusion, 12.0% by weight of masterbatch (1), 2.0% by weight of masterbatch (2) and 86.0% by weight of clear polymer were dried at a temperature of 150° C. and then melted in an extruder.

After longitudinal stretching and prior to transverse stretching, the film was coated on both sides with an aqueous dispersion by means of reverse gravure-roll coating. The dispersion comprised water and 4.2% by weight of hydrophilic polyester (PET/IPA polyester containing the sodium salt of 5-sulfoisophthalic acid, grade SP41, Ticona, USA), 0.15% by weight of colloidal silica (®Nalco 1060, Deutsche Nalco Chemie, Germany) as antiblocking agent, and 0.15% by weight of ammonium carbonate (Merck, Germany) as pH buffer. The wet application weight was 2 g/m² per coated side. After transverse stretching, the calculated thickness of the coating was 40 nm.

Example 2

A method based on Example 1 was used to produce a bilaterally coated film of 50 μm thickness. It comprised 12% by weight of masterbatch (1) and 88% by weight of clear polymer, but no blue dye.

Example 3

A coextruded white A-B-A film of 50 μm thickness was produced, A being the outer layers and B being the core layer. The mixing specification for the core layer of thickness 47 μm was the mixing specification of Example 2. The outer layers of 1.5 μm thickness comprised 93% by weight of clear polymer and 7% by weight of a masterbatch which comprised clear polymer and 10,000 ppm of silica (®Sylobloc 44 H, Grace, Germany). The film was single-side coated on one outer layer A by a method based on the mixing specification from Example 1. This film had high surface gloss.

Example 4

A method based on Example 2 was used to produce a monofilm of 50 μm thickness which, unlike Example 2, also comprised 0.6% by weight of the UV stabilizer 2-(4,6-diphenyl-1,3,5-triazin-2-yl)-5-hexyloxyphenol (®Tinuvin 1577 from the company Ciba-Geigy) (melting point 149° C., thermally stable to about 330° C.), added in the form of a 20.0% strength by weight masterbatch.

Example 5

A coextruded A-B-A film was produced of thickness 50 μm.

The base layer B of 46 μm thickness comprised PET as main constituent, 6.0% by weight of rutile-type titanium dioxide, 200 ppm of optical brightener, 0.2% by weight of hydrolysis stabilizer, and 4.0% by weight of flame retardant. The layer also comprised 30.0% by weight of self-generated regrind arising directly during production of the film.

The two outer layers of thickness 2 μm comprised PET and 0.1% by weight of Sylobloc 44 H as antiblocking agent.

The titanium dioxide and the optical brightener were metered in in the form of a masterbatch which comprised PET and 50.0% by weight of titanium dioxide (rutile-type) and 0.16% of optical brightener.

To promote homogeneous distribution, the Sylobloc 44 H, which is insoluble in the PET, was incorporated into the PET by the raw material producer.

The hydrolysis stabilizer and the flame retardant were metered in in the form of a masterbatch. The masterbatch was composed of 20.0% by weight of flame retardant (bis(5-ethyl-2-methyl-2-oxo-2$\lambda^5$-[1,3,2]dioxaphosphinan-5-ylmethyl methane-phosphonate), 1.0% by weight of hydrolysis stabilizer (pentaerythrityl tetrakis-3-(3,5-di-tert-butyl-4-hydroxyphenyl)propionate), and 79.0% by weight of PET.

Example 6

Using a method based on Example 5, an A-B-A film was produced of 50 μm thickness. Unlike in Example 5, the film was coated after longitudinal stretching as in Example 1, but only on one side. The calculated thickness of the coating after transverse stretching was 40 nm.

Example 7

A coextruded, sealable A-B-C film was produced of 50 μm thickness.

The base layer B of 48 μm thickness comprised PET as main constituent, 6.0% by weight of titanium dioxide (rutile-type, 0.2 μm particle diameter, Kerr McGee), 20 ppm of the optical brightener from Example 1, and 30.0% by weight of the self-generated regrind arising directly during production of the film.

The titanium dioxide and the optical brightener were metered in by way of a masterbatch. The titanium dioxide content was 50%. The content of optical brightener was 0.016%. The remainder up to 100% was clear polymer.

For the sealable outer layer A of thickness 1 μm, the thermoplastic used comprised 78 mol % of ethylene terephthalate and 22 mol % of ethylene isophthalate (prepared by the transesterification process using Mn as transesterification catalyst, Mn concentration: 100 ppm). It further comprised 3.0% by weight of a masterbatch made from 97.75% by weight of the copolyester mentioned, 1.0% by weight of Sylobloc 44 H, and 1.25% by weight of ®Aerosil TT 600 (fumed $SiO_2$ from the company Degussa).

The outer layer C of thickness 1 μm comprised PET and 3.0% by weight of a masterbatch made from 97.75% by weight of PET, 1.0% by weight of Sylobloc 44 H, and 1.25% by weight of Aerosil TT 600 as antiblocking agent.

Example 8

A method based on Example 7 was used to produce a coextruded, sealable A-B-C film of 50 μm thickness, the difference being that the nonsealable outer layer C was single-side coated after longitudinal stretching, as in Example 6. The calculated thickness of the coating after transverse stretching was 40 nm.

Example 9

A method based on Example 7 was used to produce a coextruded, sealable A-B-C film of 50 µm thickness, the difference being that the nonsealable outer layer C was corona-treated. The intensity selected was such as to give surface tension >45 mN/m.

Example 10

A monofilm of 50 µm thickness was produced and was similar to Example 2 in comprising 6.0% by weight of titanium dioxide and 200 ppm of optical brightener, and

Comparative Example 2

A monofilm was produced as in Example 2, the thickness being 50 µm. However, it comprised clear polymer and 6.0% by weight of anatase-type titanium dioxide (®Hombitan LW-S-U, Sachtleben, Germany), and no optical brightener was present in the film.

The properties of the films produced are seen in the table below.

TABLE 1

Property profile of films produced

| | | | E1 | E2 | E3 | E4 | E5 | E6 | E7 | E8 | E9 | E10 | E11 | CE1 | CE2 |
|---|---|---|---|---|---|---|---|---|---|---|---|---|---|---|---|
| Film structure | | | B | B | ABA | B | ABA | ABA | ABC | ABC | ABC | B | ABC | B | B |
| Thickness | | µm | 50 | 50 | 50 | 50 | 50 | 50 | 50 | 50 | 50 | 50 | 50 | 50 | 50 |
| Surface gloss | Side 1 | | 70 | 72 | 180 | 70 | 180 | 182 | 178 | 180 | 178 | 70 | 178 | 70 | 72 |
| | Side 2 | | 68 | 68 | 184 | 70 | 180 | 180 | 182 | 180 | 180 | 68 | 180 | 70 | 68 |
| Light transmittance | | % | 32 | 32 | 36 | 32 | 36 | 35 | 36 | 36 | 36 | 33 | 36 | 33 | 40 |
| Yellowness Index (YI) | | | 28 | 30 | 26 | 30 | 26 | 27 | 32 | 27 | 26 | 29 | 27 | 36 | 38 |
| Whiteness (Berger) | | | 94 | 94 | 92 | 92 | 92 | 92 | 92 | 92 | 92 | 94 | 91 | 89 | 85 |
| Modulus of | longitudinal | N/mm$^2$ | 4250 | 4200 | 4250 | 4300 | 4300 | 4200 | 4200 | 4200 | 4250 | 4200 | 4250 | 4300 | 4200 |
| elasticity | transverse | N/mm$^2$ | 5500 | 5400 | 5450 | 5400 | 5500 | 5400 | 5400 | 5450 | 5500 | 5400 | 5400 | 5450 | 5400 |
| Tensile stress | longitudinal | N/mm$^2$ | 200 | 190 | 190 | 195 | 200 | 190 | 200 | 205 | 190 | 195 | 195 | 200 | 200 |
| at break | transverse | N/mm$^2$ | 290 | 285 | 300 | 295 | 290 | 290 | 295 | 290 | 290 | 300 | 295 | 295 | 290 |
| Tensile strain | longitudinal | % | 160 | 160 | 160 | 165 | 155 | 160 | 165 | 165 | 165 | 160 | 155 | 160 | 165 |
| at break | transverse | % | 100 | 95 | 95 | 105 | 100 | 100 | 95 | 105 | 95 | 100 | 100 | 100 | 95 |
| UV resistance | | | – | – | – | good | – | – | – | – | – | good | good | – | – |
| Flame retardancy Classification | | | – | – | – | – | UL, B1, B2 | UL, B1, B2 | – | – | – | UL, B1, B2 | UL, B1, B2 | – | – |
| Coating (adhesion) | | | + | + | + | + | – | + | – | + | – | + | + | + | + |
| Minimum sealing temperature | A/A | ° C. | | | | | | | | 105 | 104 | 104 | | 105 | | |
| Seal seam strength | A/A | N/15 mm | | | | | | | | 2.4 | 2.3 | 2.4 | | 2.4 | | |
| Surface tension | | N/15 mm | 40 | 40 | 40 | 40 | 40 | 40 | 40 | 40 | 48 | 40 | 40 | 40 | 40 |
| Coloration | | | white | white | white | white | white | white | white | white | white | white | white | tinged yellow | tinged yellow | similar to Example 4 in comprising 0.6% by weight of UV stabilizer, and similar to Example 5 in comprising 0.2% by weight of hydrolysis stabilizer and 4.0% by weight of flame retardant. Each of the additives was metered in as a masterbatch, as stated.

After longitudinal stretching, the film was bilaterally coated as in Example 1. The calculated thickness of the coating after transverse stretching was 40 nm.

Example 11

An A-B-C film was produced to 50 µm thickness.

The mixing specification for the base layer B of 47 µm thickness corresponded to the mixing specification for the monofilm of Example 10, and therefore comprised PET, titanium dioxide, an optical brightener, a UV stabilizer, a flame retardant, and a hydrolysis stabilizer.

The mixing specifications for the outer layers A and C of 1.5 µm thickness corresponded to the mixing specifications of Example 7. The outer layer C was single-side coated, the method being based on Example 8.

Comparative Example 1

A monofilm was produced of 50 µm thickness and corresponded to Example 2. However, no optical brightener was present in the film.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

The priority document, German Patent Application No. 101 12 493.7, filed Mar. 15, 2001 is incorporated herein by reference in its entirety.

As used herein and in the following claims, articles such as "the", "a" and "an" can connote the singular or plural.

All documents referred to herein are specifically incorporated herein by reference in their entireties.

We claim:

1. A White, biaxially oriented film with a thickness in the range from 10 to 500 µm and a whiteness of 90% or more, whose main constituent is at least one crystallizable thermoplastic and which comprises at least one optical brightener and coloring agent consisting essentially of white pigment consisting essentially of rutile-type titanium dioxide and at least one soluble blue dye, with or without other additives, and has also at least one other functionality, said film exhbiting a light transmitttance of up to 86%, measured to ASTM D1003, said film further exhibiting a Yellowness Index of less than or equal to 30.

2. The film as claimed in claim 1, wherein the crystallizable thermoplastic is a polyethylene terephthalate, polybutylene terephthalate, polyethylene naphthalate, bibenzoyl-modified polyethylene terephthalate, or a mixture of these.

3. The film as claimed in claim 1, wherein the concentration of the white pigment present is in the range from 2.0 to 25.0% by weight based on the weight of the thermoplastic.

4. The film as claimed in in claim 1, wherein the optical brightener present comprises at least one benzoxazole derivative, triazine derivative, phenylcoumarin derivative, or bisstearylbiphenyl derivative, in amounts of from 10 to 50 000 ppm based on the weight of the crystallizable thermoplastic.

5. The film as claimed in claim 1, which has gained at least one other functionality by being provided with a flame retardant and/or with UV stabilizers (UV absorbers), and/or has been coated so as to be sealable, and/or has been coated on one or both surfaces, and/or has been corona-treated on one or both sides.

6. The film as claimed in claim 5, wherein the concentration of the UV absorber is in the range from 0.01 to 5.0% by weight, and the concentration of the soluble dye is in the range from 10 to 10 000 ppm.

7. The film as claimed in claim 5, wherein the UV absorbers present are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines, or triazines.

8. The film as claimed in claim 5, wherein the flame retardant is dissolved within the thermoplastic and is an organic phosphorus compound.

9. The film as claimed in claim 8, wherein the organic phosphorus compound is a carboxyphosphinic acid or anhydride thereof.

10. The film as claimed in claim 1, wherein a hydrolysis stabilizer is present, in the form of phenolic stabilizers, alkali metal/alkaline earth metal stearates, and/or alkali metal/alkaline earth metal carbonates, in amounts of from 0.01 to 1.0% by weight.

11. The film as claimed in claim 10, wherein the phenolic stabilizer in is present in amounts of from 0.05 to 0.6% by weight and having a molar mass above 500 g/mol.

12. The film as claimed in claim 1, wherein regrind is present.

13. The film as claimed in claim 1, wherein the dye is present in an amount of from 10 to 10,000 ppm, bused on the weight of the crystallizable thermoplastics.

14. The film as claimed in claim 12, wherein the blue dye is 1,4-bis-(butylamino)-anthraquinone dye.

15. The film as claimed in claim 1, wherein the crystallizable thermoplastic has a polyethylene glycol content of 1% by weight or more and the film is thermoformable.

16. A white, biaxially oriented film with a thickness in the range from 10 to 500 μm and a whiteness of 90% or more in the absence of dye, whose main constituent is at least one crystallizable thermoplastic and which comprises pigment consisting essentially of rutile-type titanium dioxide and at least one optical brightener, said film having at least one other functionality, wherein said film exhbits a transparency of less than or equal to 40% and a Yellowness Index of less than or equal to 30.

17. A film according to claim 7, wherein the UV absorbers are 2-hydroxybenzotriazoles or triazines.

18. A film according to claim 7, wherein the UV absorbers are 2-(4,6-diphenyl-1,3,5-triazin-2-yl)-5-hexyloxyphenol or 2,2'-methylenebis(6-(2H-benzotriazol-2-yl)-4-(1,1,2,2-tetra-methylpropyl)phenol).

* * * * *